United States Patent
Dao (10) Patent No.: US 11,145,233 B1
(45) Date of Patent: Oct. 12, 2021

(54) MASKING FOR MITIGATING VISUAL CONTRAST OF A CAMERA REGION OF A DISPLAY

(71) Applicant: Motorola Mobility LLC, Chicago, IL (US)

(72) Inventor: Kevin Ha Dao, Skokie, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/908,451

(22) Filed: Jun. 22, 2020

(51) Int. Cl.
  *G09G 3/20* (2006.01)
  *H04N 5/225* (2006.01)

(52) U.S. Cl.
  CPC ............ *G09G 3/20* (2013.01); *H04N 5/2252* (2013.01); *H04N 5/2253* (2013.01); *G09G 2320/0233* (2013.01); *G09G 2320/0242* (2013.01)

(58) Field of Classification Search
  CPC ............ G09G 3/20; G09G 2320/0233; G09G 2320/0242; H04N 5/2252; H04N 5/2253
  See application file for complete search history.

(56) References Cited

U.S. PATENT DOCUMENTS

| 2015/0145894 | A1* | 5/2015 | Kim | G09G 3/3607 345/690 |
| 2017/0195579 | A1* | 7/2017 | Desai | H04N 5/2351 |
| 2017/0229059 | A1* | 8/2017 | Bonnier | G06F 3/017 |
| 2017/0280986 | A1* | 10/2017 | Sekowski | A61B 1/015 |
| 2020/0068103 | A1* | 2/2020 | Huang | G02B 3/00 |
| 2020/0211443 | A1* | 7/2020 | Zeng | G09G 3/2074 |

OTHER PUBLICATIONS

"Radial Gradient", Retrieved at: https://www.manula.com/manuals/fxhome/hitfilm-pro/13/en/topic/radial-gradient—on May 6, 2020, 2 pages.
Antonio-Torres,"LUT-based compensation model for OLED degradation", Dec. 2005, pp. 435-441.
Debara,"The Gradient Design Trend: What it Looks Like and How to Use It", Retrieved at: https://99designs.com/blog/trends/gradient-design-trend/—on May 6, 2020, 21 pages.

* cited by examiner

*Primary Examiner* — Vinh T Lam
(74) *Attorney, Agent, or Firm* — FIG. 1 Docket (57) ABSTRACT

Implementations for masking for mitigating visual contrast of a camera region of a display are described. Generally, the described techniques provide ways for mitigating visual differences between a camera region and other regions of a display. For instance, visual masks can be generated and displayed overlapping and/or peripherally to a camera region of a display to smooth a visual transition between the camera region and other regions of the display. The masks, for example, are displayed in regions of the display that surround the camera region. Further, color attributes of the masks can be configured to provide a gradual visual transition from color output at the camera region to color output at other regions of the display.

20 Claims, 10 Drawing Sheets
(3 of 10 Drawing Sheet(s) Filed in Color)

| Brightness (nits) | | 500 | 420 | 350 | 300 | 250 | 200 | 100 | 50 |
|---|---|---|---|---|---|---|---|---|---|
| T95 Lifetime (hrs) | Camera Region | 90 | 120 | 156 | 194 | 255 | 356 | 1009 | 2855 |
| | Peripheral Region(s) | 545 | 708 | 931 | 1173 | 1542 | 2155 | 6097 | 17245 |

MASKING FOR MITIGATING VISUAL CONTRAST OF A CAMERA REGION OF A DISPLAY

BACKGROUND

Modern devices provide an array of image capture technologies, such as via implementation of cameras for capturing digital images, digital video, and so forth. For instance, mobile devices such as mobile phones, tablets, and so forth, typically include camera functionality for capturing images from a variety of angles, including front facing and rear facing cameras. However, the push toward maximizing screen area of device displays presents challenges in camera placement for front facing cameras.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Implementations of the techniques for masking for mitigating visual contrast of a camera region of a display are described with reference to the following Figures. The same numbers may be used throughout to reference like features and components shown in the Figures.

DETAILED DESCRIPTION

Implementations for masking for mitigating visual contrast of a camera region of a display are described, and provide techniques to address differences in visual appearance between a camera region and other regions of a display. For instance, consider a device such as a mobile phone that positions a camera underneath a display screen of the device. Generally, placing the camera underneath the display allows for enhanced screen space as compared with conventional devices that typically reduce display size to accommodate camera positions adjacent a display. Placing the camera underneath the display, however, presents a number of implementation challenges. For instance, to enable optimal light transmission to and from the camera, a region of the display above the camera can be optimized. One technique for optimizing a camera region of a display is to utilize smaller pixels and/or lower pixel density in the camera region than is utilized in other regions of the display. Generally, this allows for increased light transmission through the camera region as compared with other regions of the display.

While utilizing smaller pixels in a camera region may enhance light transmission in that region of a display, smaller pixels typically require increased power input to drive the pixels to achieve a particular output level (e.g., brightness and/or luminance) than is required for larger pixels that are utilized in other regions of the display. Further, by driving the smaller pixels with higher power input, output level of the camera region may decay more quickly than other regions of the display that are driven with less power input. This can cause differences in visual output, such as brightness and color intensity, that may result in visual contrast between the camera region and other regions of the display. Such visual contrast can cause the camera region to be visually obtrusive to content presented on a display, and thus reduce the overall visual quality of the content.

Accordingly, the described techniques provide ways for mitigating visual differences between a camera region and other regions of a display. For instance, visual masks can be generated and displayed overlapping and/or peripherally to a camera region of a display to smooth a visual transition between the camera region and other regions of the display. The masks, for example, are displayed in regions of the display that surround the camera region. Further, color attributes of the masks can be configured to provide a gradual visual transition from color output at the camera region to color output at other regions of the display. For instance, consider a scenario where a camera region displays a particular color at a first intensity, and other display regions display the color at a second, different intensity. To mitigate visual contrast between the camera region and the other display regions, one or more masks can be generated to provide an incremental change in the color intensity between the first and second intensity levels. The masks can then be displayed overlapping and/or surrounding the camera region to provide a less visually apparent transition between the camera region and the other regions of the display.

To determine when and how to display masks, output usage of a camera region can be tracked and compared to a usage threshold and/or set of usage thresholds. The output usage, for instance, represents an output level of pixels of the camera region (e.g., brightness and/or luminance) and a duration of visual output of the pixels. For example, the output usage indicates a duration of time that the camera region displays output at different particular output levels. The output usage can be compared to the usage threshold(s) to estimate a relative output decay of the camera region, such as a decreased brightness of the camera region caused by driving the pixels at a particular power level for a specific duration of time. When the estimated output decay reaches a particular defined usage threshold, this may indicate that visual contrast between the camera region and other regions of the display have reached the point that the camera region may become visually distinguishable by a user from the other regions. Accordingly, a set of one or more masks can be generated and displayed as described herein to reduce the prominence of the visual contrast between the camera region and the other region.

Thus, the techniques described herein enable increased content display quality by applying masks overlapping and/or peripherally to a camera region of a display to visually obscure differences in output levels between the camera region and other regions of the display. In at least some implementations, this enables the amount of power used to drive pixels of the camera region to be reduced, thus reducing power resource (e.g., battery) usage of a device and increasing pixel life of the camera region by reducing a rate of decay of the pixels.

While features and concepts of masking for mitigating visual contrast of a camera region of a display can be implemented in any number of different devices, systems, environments, and/or configurations, implementations of masking for mitigating visual contrast of a camera region of a display are described in the context of the following example devices, systems, and method.

Figure 1:
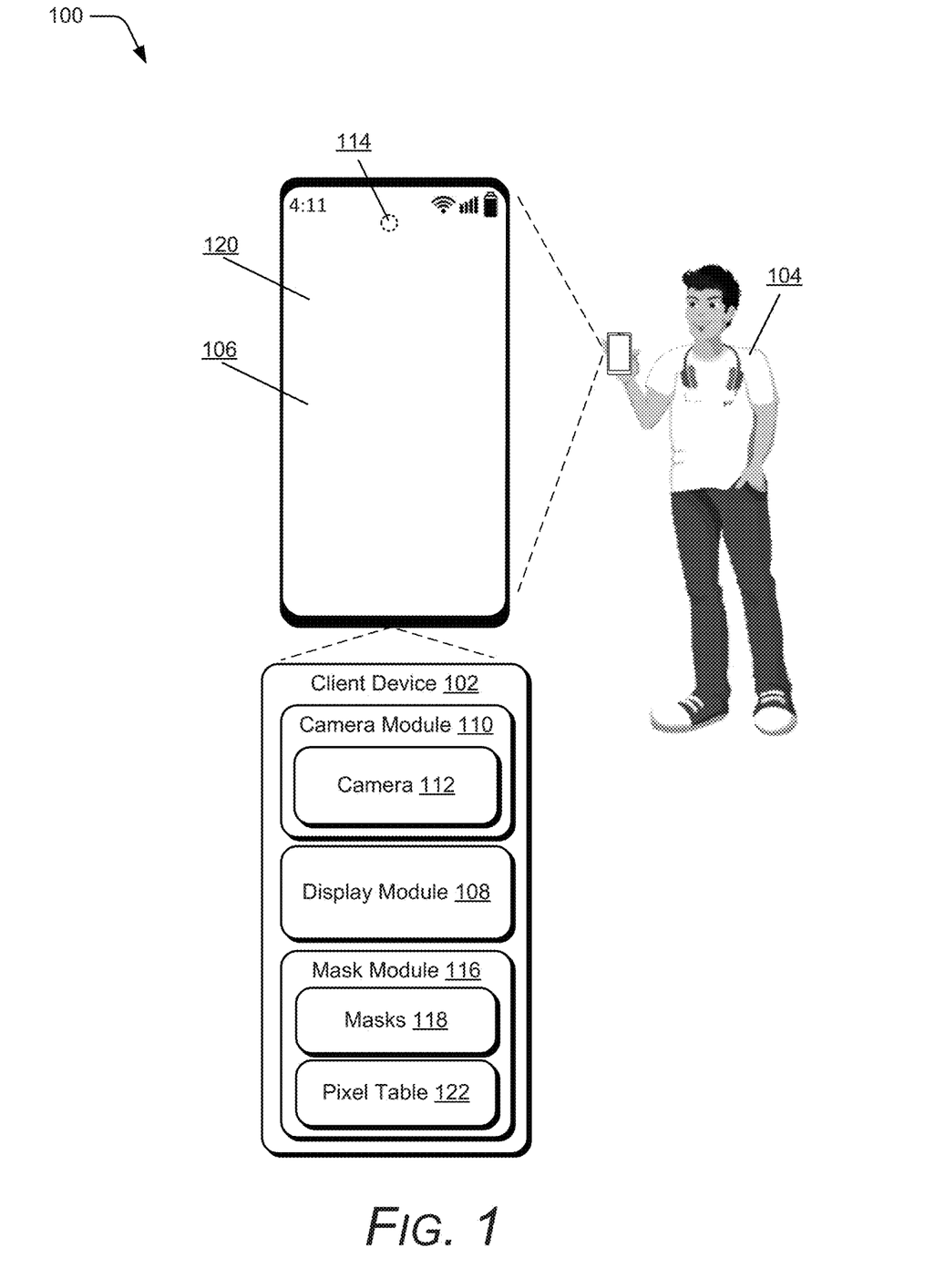
FIG. 1 depicts an environment in which techniques for masking for mitigating visual contrast of a camera region of a display may be employed in accordance with one or more implementations of the techniques described herein.

FIG. 1 depicts an environment 100 in which techniques for masking for mitigating visual contrast of a camera region of a display may be employed. The environment 100 includes a client device 102 being held by a user 104. Generally, the client device 102 may be implemented in a variety of different ways, such as a smartphone, a tablet device, a laptop, a wearable computing device (e.g., a smartwatch or a fitness tracker), a desktop computer, and so forth. These examples are not to be construed as limiting, however, and the client device 102 can be implemented in a variety of different ways and form factors. Further example attributes of the client device 102 are discussed below with reference to the device 1000 of FIG. 10.

The client device 102 includes functionality for visual output, including a display screen ("display") 106 that is operable via a display module 108. Generally, the display 106 can be implemented via a variety of different display technologies, such as light-emitting diode (LED), liquid-crystal display (LCD), organic light-emitting diode (OLED), and so forth. Further, the display module 108 represents functionality for managing functionality of the display 106, such as output provided by and input received by the display 106. The display module 108, for instance, includes hardware and logic for driving functionality of the display 106.

The client device 102 further includes functionality for enabling image capture, including a camera module 110 that implements a camera 112. Generally, the camera 112 represents hardware for capturing images, such as still images, video, and so forth. The camera 112, for instance, includes hardware such as an optical lens or set of lenses, a light sensor, a flash, an aperture, and so forth. Further, the camera module 110 includes hardware and/or logic for managing image capture via the camera 112.

Generally, the camera 112 is positioned at a camera region 114 of the display 106. The camera region 114, for instance, represents a subregion of the display 106, and the camera 112 is positioned beneath the display 106 at the camera region 114. For instance, the camera 112 is positioned beneath a surface of the display 106 and beneath the camera region 114, an example of which is depicted below in FIG. 2. The camera region 114 is illustrated here using a dashed circle for purposes of example only (i.e., the dashed circle is not displayed in operation), and it is to be appreciated that typically, the camera 112 is not readily visually distinguishable from other regions of the display 106.

Further to techniques for masking for mitigating visual contrast of a camera region of a display described herein, the client device 102 leverages a mask module 116 to apply visual masks 118 adjacent the camera region 114. The mask module 116, for example, can be implemented as a functionality of the display module 108, and/or as functionality that resides elsewhere in the client device 102. For instance, as further detailed below, the camera region 114 of the display 106 includes a different pixel configuration than peripheral regions 120 of the display 106. Generally, the peripheral regions 120 represent portions of the display 106 that surround the camera region 114, such as the entirety of the display 106 with the exception of the camera region 114. Accordingly, applying the masks 118 can enable differences in visual appearance of the camera region 114 and peripheral regions 120 to be visually minimized, e.g., "masked" to reduce visual contrast between content displayed on the peripheral regions 120 and the camera region 114. In at least some implementations, display of the masks 118 is determined based on a pixel table 122, which specifies differences in pixel output of the camera region 114 of the display 106, and pixel output of the peripheral regions 120. The pixel table 122, for instance, includes brightness decay parameters for pixels of the camera region 114 and the peripheral regions 120, such as parameters describing how brightness of the pixels decay over time. Generally, the mask module 116 can utilize data from the pixel table 122 to determine how to apply different instances and combinations of the masks 118.

Figure 2:
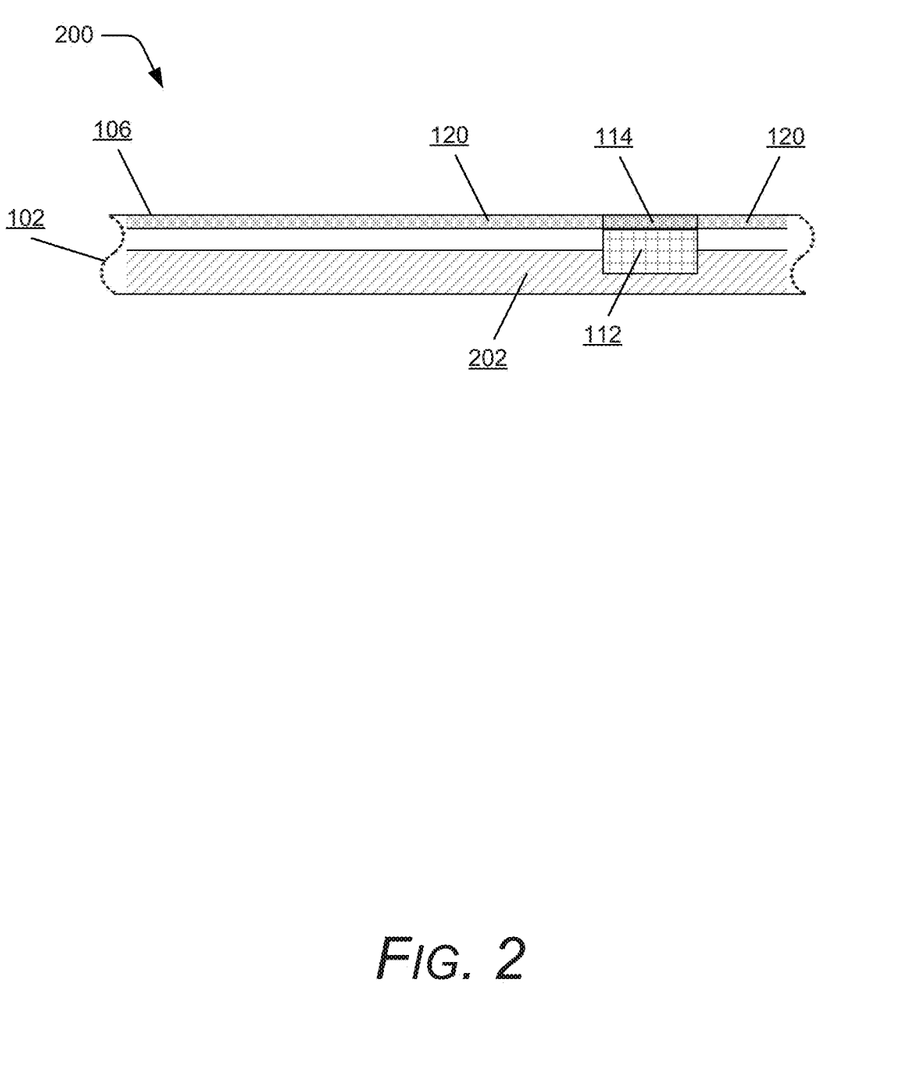
FIG. 2 depicts a partial cross section view of a client device in accordance with one or more implementations of the techniques described herein.

FIG. 2 depicts a partial cross section view 200 of the client device 102 in accordance with one or more implementations. The cross section view 200 illustrates the display 106 including the camera region 114 and peripheral regions 120, along with the camera 112 affixed to an internal structure 202 of the client device 102. The internal structure 202, for instance, represents a printed circuit board (PCB) to which various components of the client device 102 are attached, including the camera 112. As illustrated, the camera 112 is positioned directly beneath the camera region 114 of the display 106. Generally, as part of capturing images by the camera 112, light that is captured at the camera 112 is transmitted through the camera region 114. Further, the camera 112 may also transmit light through the camera region 114, such as for providing flash illumination as part of image capture. As detailed throughout this disclosure, various attributes of the camera region 114 can be configured to accommodate light capture and/or light transmission through the camera region 114, such as pixel size, pixel density, etc., of the camera region 114.

Figure 3:
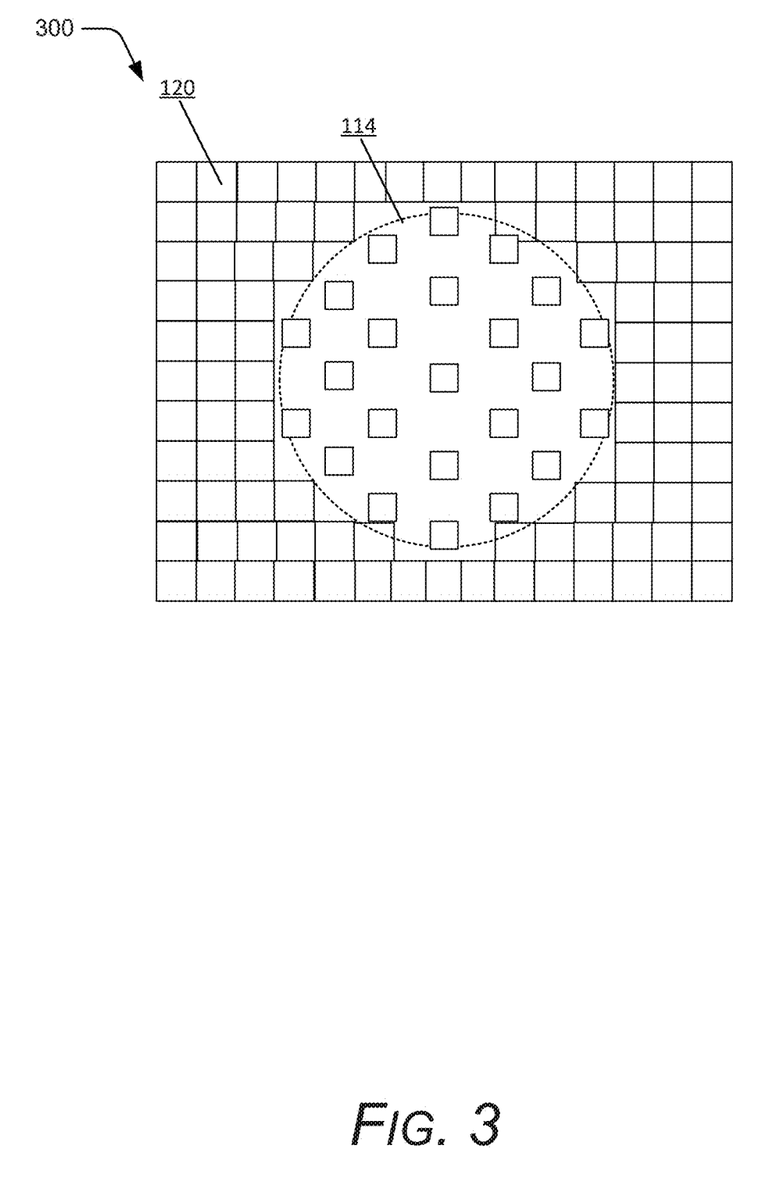
FIG. 3 depicts a closeup facing view of portions of a display including a camera region and peripheral regions in accordance with one or more implementations of the techniques described herein.

FIG. 3 depicts a closeup facing view 300 of portions of the display 106 including the camera region 114 and peripheral regions 120. Generally, the rectangles that make up the camera region 114 and the peripheral regions 120 represent pixels of the various regions of the display 106. As illustrated, the pixels of the camera region 114 are smaller than the pixels of the peripheral regions 120. Further, the pixels of the camera region 114 are of equal or lesser density (e.g., pixels per inch (PPI)) than the pixels of the peripheral regions 120. In at least some implementations, by utilizing smaller and less dense pixels at the camera region 114, the camera region 114 achieves higher light transmittance than does the peripheral regions 120. For instance, when a light source is incident on the display 106 across the camera region 114 and the peripheral regions 120, a higher percentage of light from the light source will be transmitted across the camera region 114 than across the peripheral regions 120. The pixel arrangements and dimensions depicted in FIG. 3 are presented for purpose of example only, and it is to be appreciated that a variety of different pixel configurations can be employed within the context of the implementations described herein.

Figure 4:
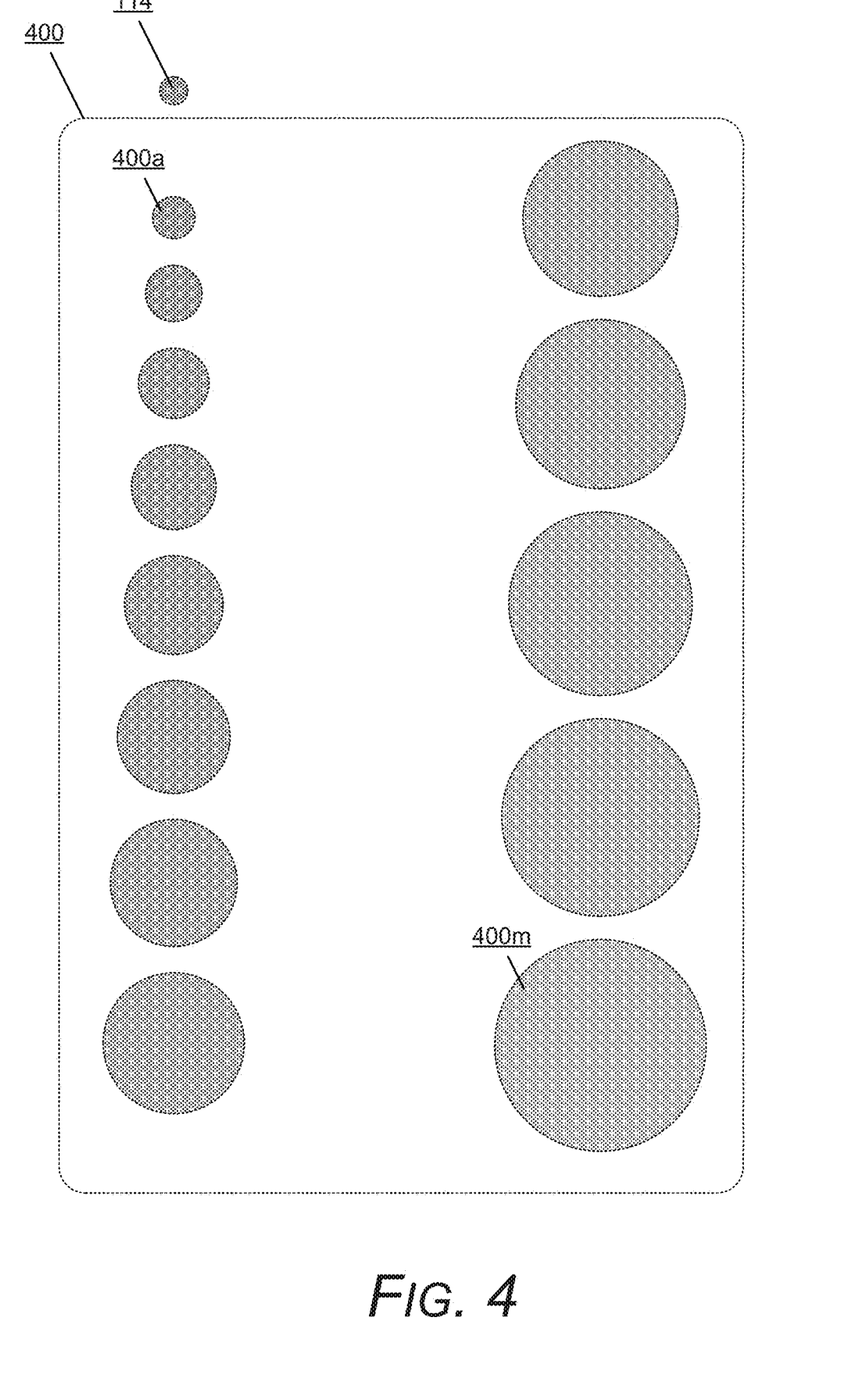
FIG. 4 depicts a set of masks that can be applied adjacent a camera region in accordance with one or more implementations of the techniques described herein.
Figure 8:
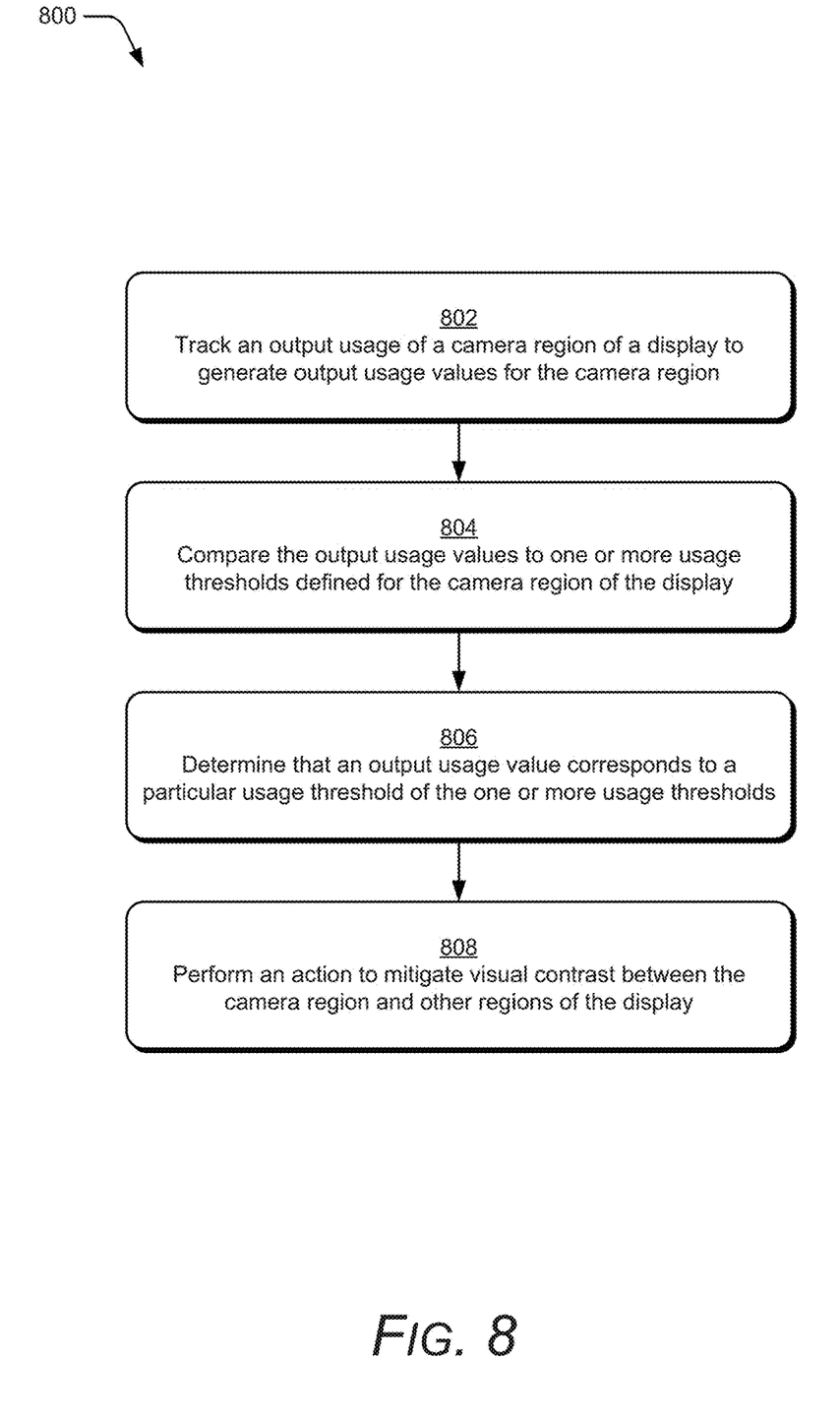
FIG. 8 illustrates an example method for determining that an output condition pertaining to a camera region occurs in accordance with one or more implementations of the techniques described herein.

FIG. 4 depicts a set of masks 400 that can be applied in conjunction with the camera region 114. The masks 400, for instance, represent instances of the masks 118 introduced above. Individual instances and/or combinations of the masks 400, for instance, can be applied (e.g., displayed) overlapping the camera region 114 and in peripheral regions 120 surrounding the camera region 114 to mitigate visual contrast between the camera region 114 and peripheral regions 120 of the display 106. Generally, which mask 400 and/or combination of masks 400 that is applied around the camera region 114 can be dependent on a particular condition of the camera region 114, such as a brightness and/or color condition of the camera region 114. In at least some implementations, a pixel decay algorithm is utilized to track pixel output of the camera region 114. As different thresholds occur in the pixel decay algorithm, different instances and/or combinations of the masks 400 can be applied to visually blend the camera region 114 with the peripheral regions 120. One example of a pixel decay algorithm is discussed below with reference to the method 800.

In at least some implementations, color attributes of the masks 400 are configured as a series of gradually changing values, such as red green blue (RGB) values, hue saturation lightness (HSL) values, and so forth. For instance, consider that the camera region 114 is estimated to have a color attribute $A_C$ value of v. Accordingly, $A_C$ values for the masks 400 can gradually increase or decrease starting with a mask 400a to an $A_C$ value of v±n for a mask 400m. Generally, this enables color attributes of regions surrounding the camera region 114 to gradually change with increasing distance from a perimeter of the camera region to enable visual blending of the camera region 114 with the peripheral regions 120.

Figure 5:
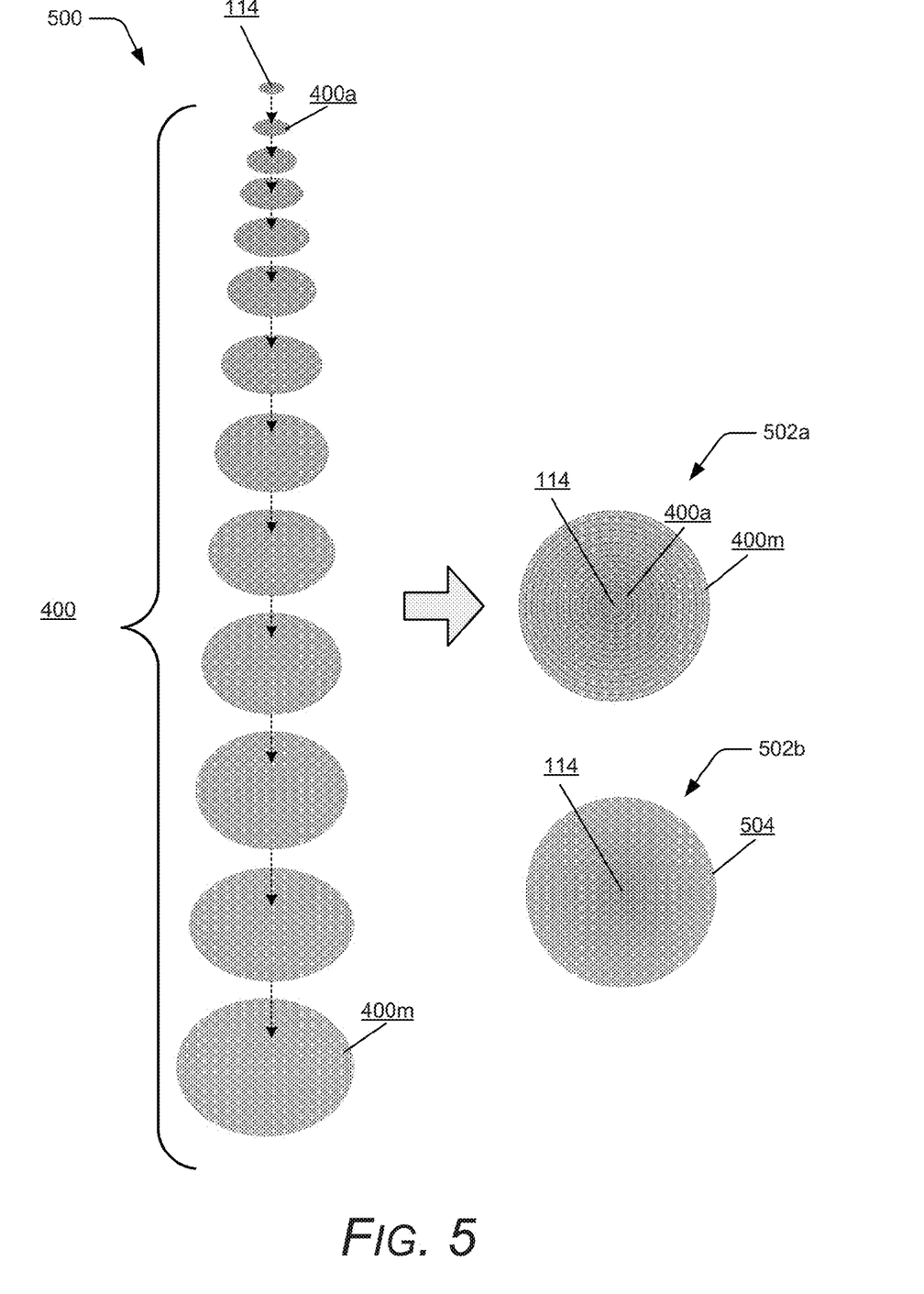
FIG. 5 depicts a scenario showing an example visual arrangement of masks relative to the camera region in accordance with one or more implementations of the techniques described herein.

FIG. 5 depicts a scenario 500 showing an example visual arrangement of the masks 400 relative to the camera region 114. The masks 400, for instance, are depicted in a stack to represent an example visual z order for displaying instances of the masks 400 on the display 106 relative to the camera region 114. For instance, as each successive mask 400 is displayed, it is displayed behind (e.g., stacked underneath) a previous mask 400. For instance, the scenario 500 further depicts a mask stack 502a that represents stacking of multiple masks 400 relative to (e.g., and concentric with) the camera region 114. The camera region 114, for example, is at the top of the mask stack 502a, and the masks 400 are stacked successively underneath one another beneath the camera region 114 starting with the mask 400a and ending with the mask 400m. While a particular number of masks 400 are depicted in the mask stack 502a, it is to be appreciated that any number (one or more) of masks 400 can be displayed, such as based on a visual condition of the camera region 114. The dashed lines included in the mask stack 502a are presented to demonstrate the periphery of the camera region 114 and the respective masks 400, but it is to be appreciated that in operation the dashed lines would not be displayed. For instance, a mask stack 502b is depicted without the dashed lines, showing a gradual visual transition from the camera region 114 at the center to an outer perimeter 504 of the mask stack 502b.

Figure 6:
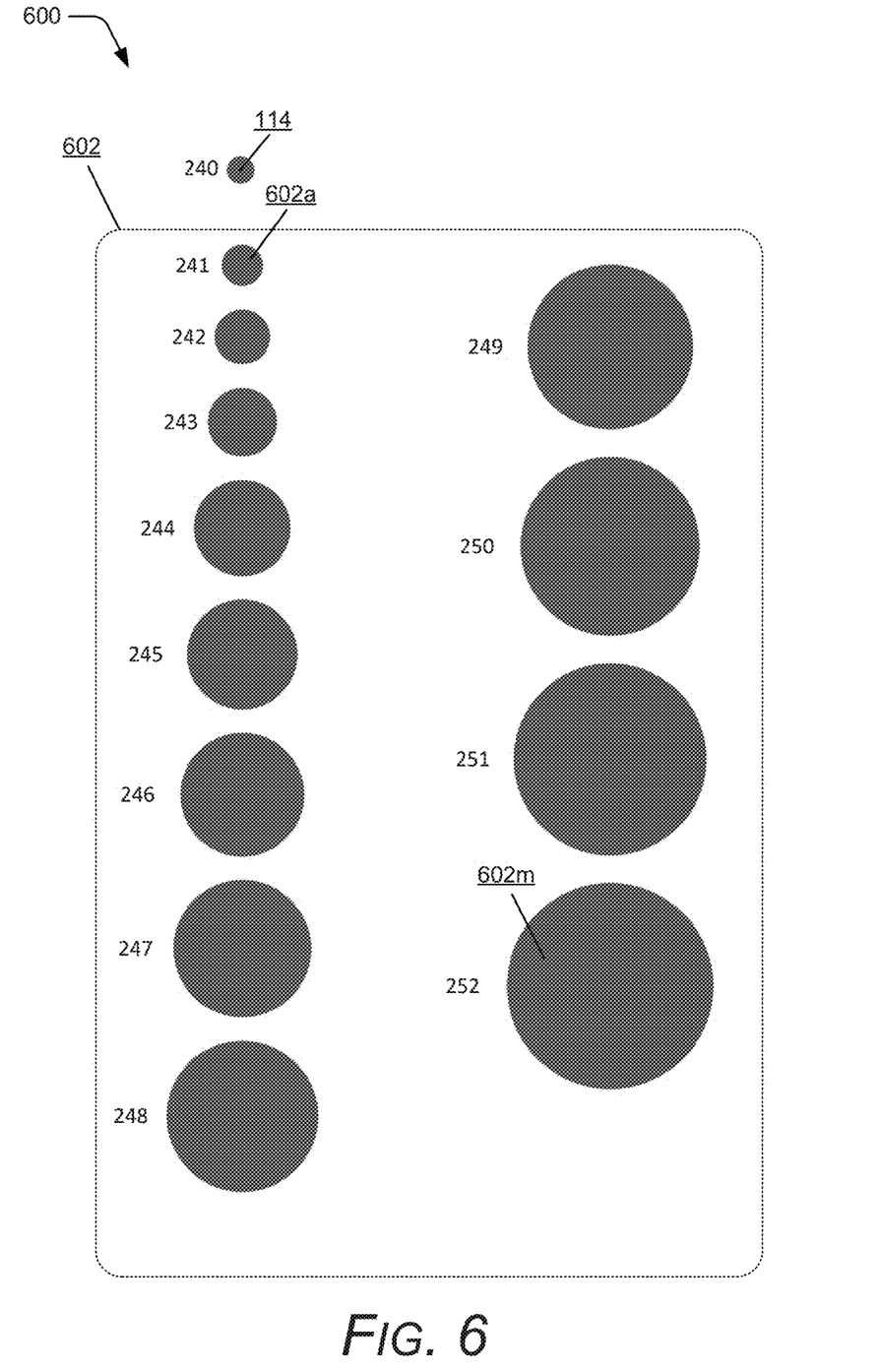
FIG. 6 depicts an example scenario for a color mask stack in accordance with one or more implementations of the techniques described herein.

FIG. 6 depicts an example scenario 600 for a color mask stack in accordance with one or more implementations. In the scenario 600, the camera region 114 is displaying red with an R intensity value of 240 and Green and Blue intensity values of zero. Accordingly, to enable the camera region 114 to be visually blended with the peripheral regions 120, a set of masks 602 are generated that can be applied in conjunction with the camera region 114, such as for display in peripheral regions 120 surrounding the camera region 114. The masks 602, for instance, represent instances of the masks 118.

In this particular example, the R intensity values for each of the masks 602 is depicted adjacent reach respective mask 602, showing a gradual increase from the R240 value of the camera region starting with R value of 241 for a mask 602a to an R intensity value of 252 for a mask 602m. Consider, for instance, that peripheral regions 120 of the display 106 are displaying the color red at an R intensity of 253 while the camera region 114 displays red at R intensity 240, as depicted. Accordingly, by stacking the masks 602 in order as shown and with gradually increasing R intensities, visual contrast between the camera region 114 and the peripheral regions 120 can be minimized.

Generally, the shape, size, and arrangement of the masks depicted in the scenarios above are presented for purpose of example only, and it is to be appreciated that a wide variety of different shapes, sizes, colors, and arrangements of masks may be implemented within the scope of the claimed implementations. For instance, masks of a variety of different shapes (e.g., rectangles, triangles, irregular shapes, etc.) may be utilized and combined to further mitigate contrast between a camera region and peripheral regions of a display. Further, size difference between masks that are applied (e.g., in a mask stack) can be varied to provide different contrast gradients. As part of displaying graphics in a camera region and peripheral regions of a display, various colors, color combinations, and color gradients may be utilized within masks, such as to match primary graphics displayed on a device's display. Further, different instances of masks can also be selected and applied to mitigate visual differences between a camera region and a non-camera region of a display, such as to provide a non-linear change in color attributes between the camera region and peripheral regions.

The various implementations depicted and discussed above may be combined and iterated in various ways to provide a wide variety of different visual masks for mitigating visual differences between a camera region and other regions of a display.

Figure 7:
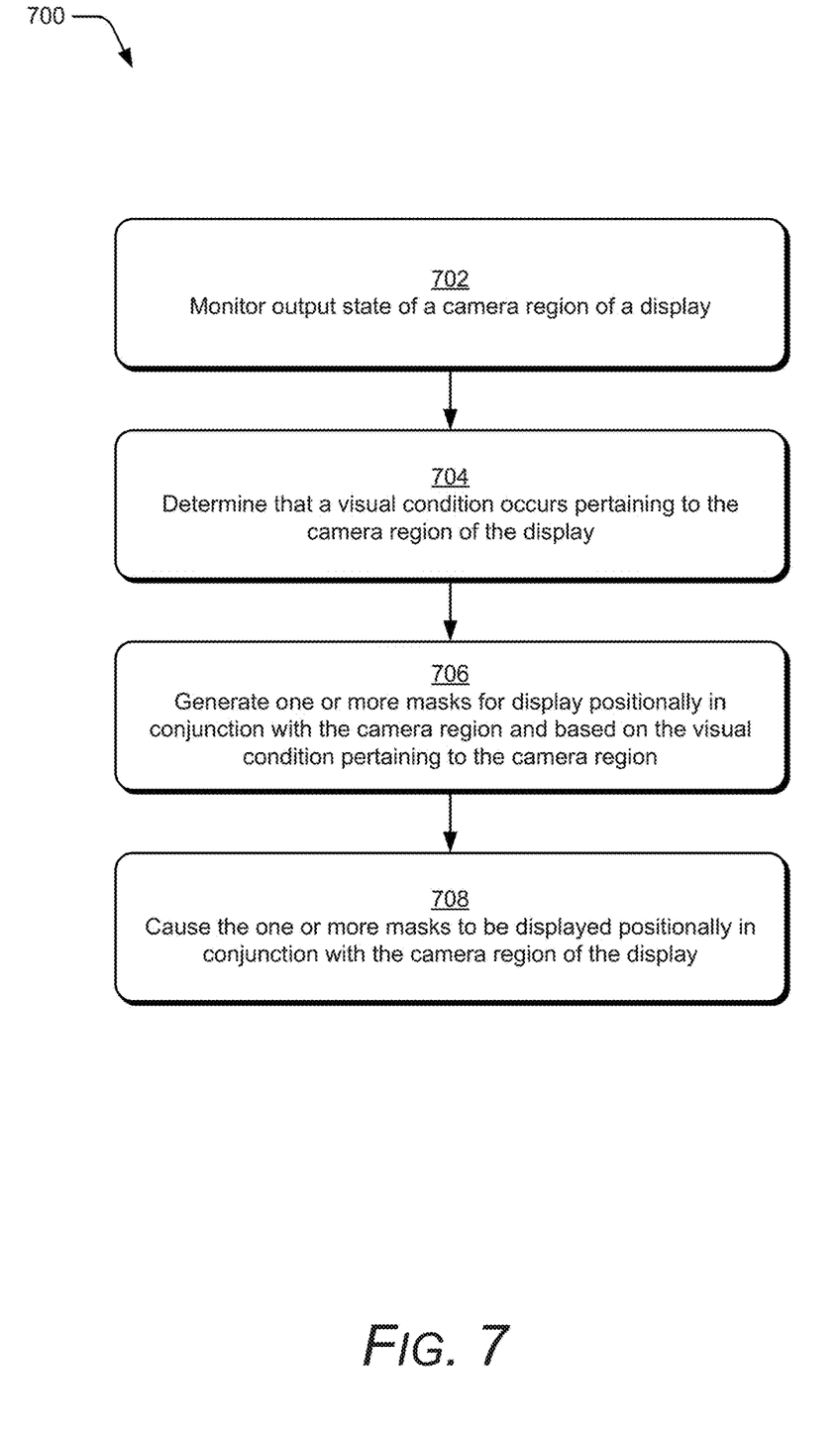
FIG. 7 illustrates an example method for applying masks in conjunction with a camera region in accordance with one or more implementations of the techniques described herein.

FIG. 7 illustrates an example method 700 for applying masks in conjunction with a camera region according to various implementations. At 702, output state of a camera region of a display is monitored. The output state, for instance, corresponds to one or more states of the camera region, such as a logical state, a measured output state, and so forth. As further detailed below, for instance, the output state can be based on output usage of the camera region that is tracked. Alternatively or additionally, the output state can be based on measured output of the camera region, such as measured pixel brightness, color intensity, pixel gamma, and so forth.

At 704, it is determined that an output condition occurs pertaining to the camera region of a display. The output condition, for instance, is based on a particular observed output state of the camera region. For example, implementations can track output usage of the camera region, and compare the output usage to one or more usage thresholds. Thus, the output condition can be based on tracked output usage reaching a particular usage threshold for the camera region. Alternatively or additionally, in implementations that measure output of the camera region, the measured output can be compared to one or more output threshold values for output of the camera region and the output condition can occur when the measured output reaches a particular output threshold. In at least some implementations, the output condition can be detected based on table lookups to the pixel table 122, such as by correlating output usage values and/or measured output values of the camera region to thresholds defined based on the pixel table 122.

At 706, one or more masks are generated for display positionally in conjunction with the camera region and based on the output condition pertaining to the camera region. The one or more masks, for instance, can be selected based on the output condition, such as based on a mask mapping specified by the pixel table 122. For example, the pixel table 122 can map particular output conditions to a mask 118 and/or set of masks 118. The mask(s), for instance, are generated based on color, intensity, shading, pattern(s), etc., to be displayed in the masks to mitigate a visual contrast between the camera region and other regions of the display.

At 708, the one or more masks are caused to be displayed positionally in conjunction with the camera region of the display. The one or more masks, for example, are displayed overlapping the camera region and in the peripheral region (s) surrounding the camera region, such as via disks and/or other shape(s) overlapping and surrounding the camera region.

FIG. 8 illustrates an example method 800 for determining that an output condition pertaining to a camera region occurs according to various implementations. The method, for instance, describes an example way for performing step 704 above for determining that an output condition occurs. At 802, an output usage of a camera region of a display is tracked to generate output usage values for the camera region. In at least one implementation, tracking output usage of the camera region includes tracking output brightness of pixels of the display 106 over time, including output of the camera region 114 and the peripheral regions 120. For instance, the mask module 116 can leverage the pixel table 122 to track accrued pixel output times for the camera region 114 and the peripheral regions 120 at particular brightness settings, such as based on actual output brightness (e.g., as measured in nits) and/or estimated output brightness based on power (e.g., voltage) applied to the respective pixels. In at least one implementation, this includes recording a pixel lifetime activation starting with zero (e.g., zero hours) when a display is initially activated, and recording an amount of time pixels are activated, and may optionally including recording a relative output level of the pixels. Thus, generated output usage values can indicate duration of pixel output of the camera region at different brightness (e.g., luminance) values.

At 804, the output usage values are compared to one or more usage thresholds defined for the camera region of the display. A usage threshold, for example, is based on a specified pixel output time at a particular brightness. For instance, the pixel table 122 includes a decay table that describes how output brightness of pixels over time causes output decay (e.g., brightness decay) of the pixels over time.

Figure 9:
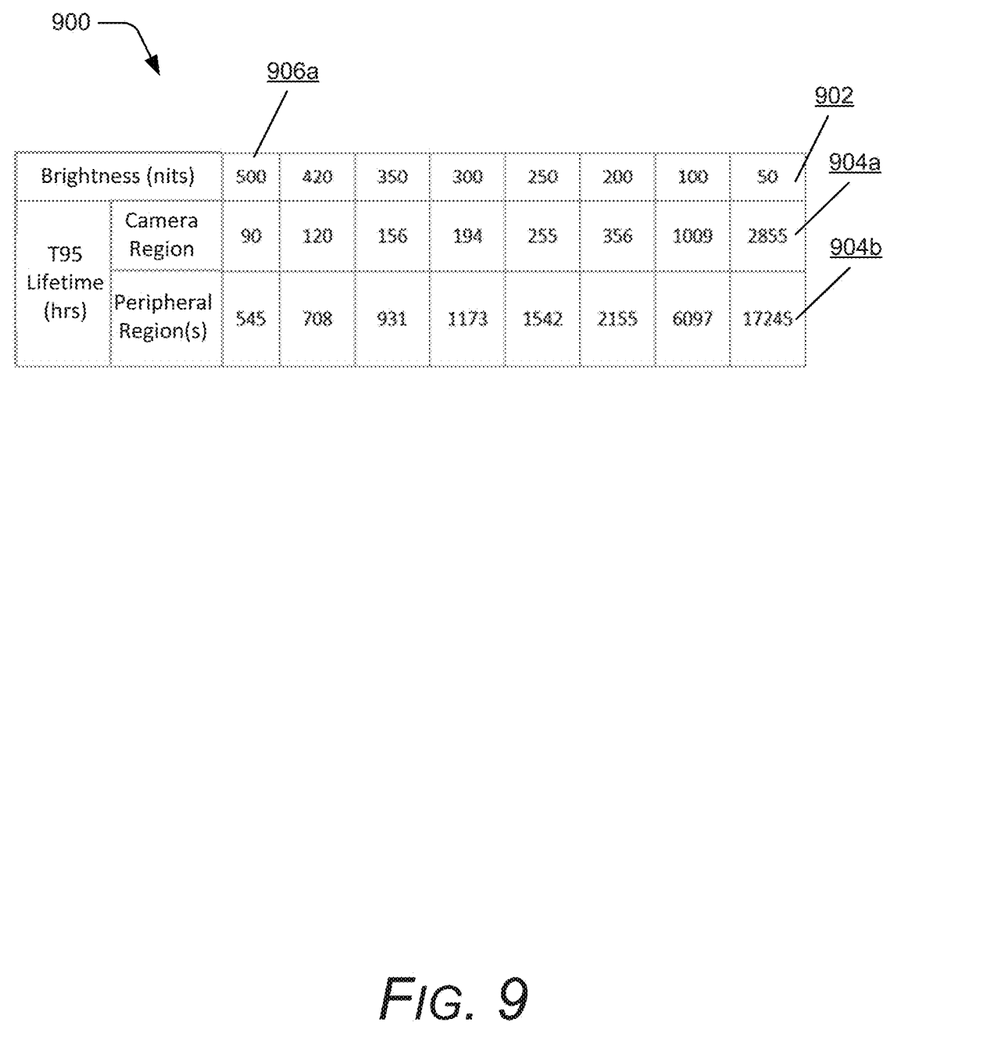
FIG. 9 depicts an example decay table that describes an estimated brightness decay of different pixel regions over time in accordance with one or more implementations of the techniques described herein.

FIG. 9, for example, depicts a decay table 900 that describes an estimated brightness decay of different pixel regions over time and based on output brightness. The decay table 900 is presented for purpose of example only, and it is to be appreciated that a variety of different table attributes and values not expressly described herein can be employed, such as based on different display design attributes and other factors.

In the decay table 900, a row 902 specifies different brightness output settings of pixels, such as measured in nits, i.e., candelas per square meter. Further, a row 904a includes different estimated brightness decay times for pixels of the camera region 114, and a row 904b includes different estimated brightness decay times for pixels of the peripheral regions 120. Generally, the different brightness decay times correspond to estimated T95 lifetime estimates for the different pixels, which indicates an elapsed time measured from an initial luminance indicated in row 902 to a reduction in luminance by 5% from its initial value. For instance, consider a column 906a, which includes estimated brightness decay times for the camera region 114 and the peripheral regions 120 at a luminance of 500 nits. At 500 nits, brightness output of pixels of the camera region 114 is estimated to decay by 5% after 90 hours of output. Further, brightness output of pixels of the peripheral regions is estimated to decay by 5% after 545 hours of output at 500 nits. Thus, pixels of the camera region 114 experience a more rapid brightness decay than do the pixels of the peripheral regions 120. Generally, this can occur since the pixels of the camera region are smaller than pixels of the peripheral regions 120, and thus more power (e.g., voltage) is required to drive the pixels of the camera region 114 than is required to drive pixels of the peripheral regions 120 to achieve the same brightness output.

Thus, in at least some implementations, the brightness decay values specified in the row 904a for the pixels of the camera region 114 can be utilized as different usage thresholds that can trigger different actions, such as generating and applying different masks 118. In practice, brightness output of pixels may vary based on brightness settings of a device (e.g., the client device 102), including manual changes to brightness settings caused by user interaction, and automatic changes to brightness settings, such as based on detected changes in a surrounding environment. Thus, pixel brightness output over time can be averaged and compared to different usage thresholds.

At 806, it is determined that an output usage value corresponds to a particular usage threshold of the one or more usage thresholds. The mask module 116, for example, determines that a determined output usage value matches a particular usage threshold, such as based on brightness decay values specified in the decay table 900. A usage threshold, for instance, represents an estimated amount of decay in pixel output.

At 808, an action is performed to mitigate visual contrast between the camera region and other regions of the display. The mask module 116, for instance, generates a set of one or more masks 118 and causes the masks to be displayed in regions of the display 106 that are overlapping and/or peripheral to the camera region 114. Alternatively or additionally, the display module 108 can modulate a brightness of the camera region 114, such as by increasing power applied to drive the pixels of the camera region 114 and thus increasing output brightness of the camera region.

The example methods described above may be performed in various ways, such as for implementing different aspects of the systems and scenarios described herein. For instance, aspects of the methods may be implemented by the mask module 116 and various aspects of the methods may be implemented in the context of the various scenarios described above. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 10:
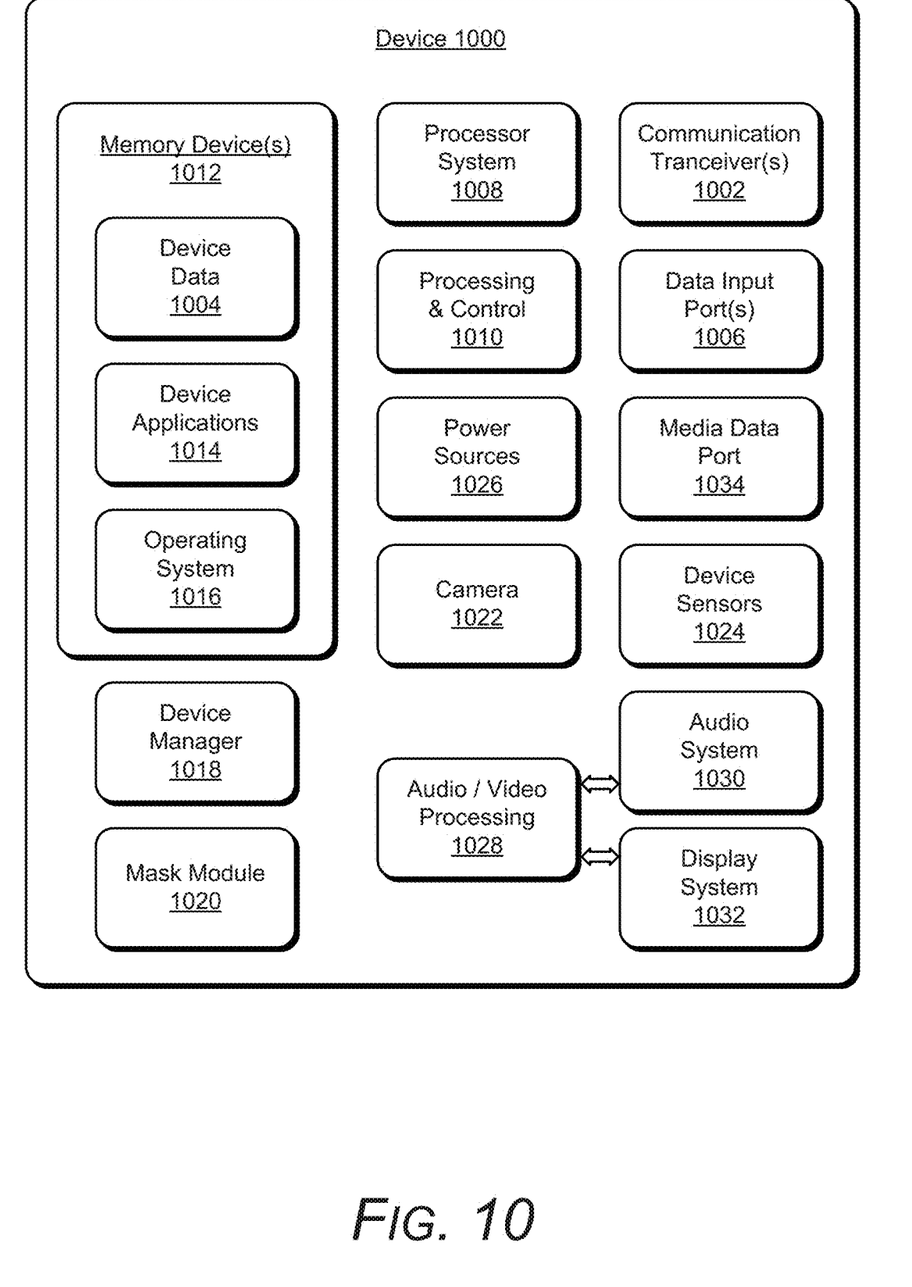
FIG. 10 illustrates various components of an example device that can used to implement the techniques of masking for mitigating visual contrast of a camera region of a display as described herein.

FIG. 10 illustrates various components of an example device 1000, in which aspects of masking for mitigating visual contrast of a camera region of a display can be implemented. The example device 1000 can be implemented as any of the devices described with reference to the previous FIGS. 1-9, such as any type of a wireless device, mobile phone, client device, companion device, paired device, display device, tablet, computing, communication, entertainment, gaming, media playback, and/or any other type of computing and/or electronic device. For example, the client device 102 described above may be implemented as the example device 1000.

The device 1000 includes communication transceivers 1002 that enable wired and/or wireless communication of device data 1004 with other devices. The device data 1004 can include any type of audio, video, and/or image data. Example communication transceivers 1002 include wireless personal area network (WPAN) radios compliant with various IEEE 1002.15 (Bluetooth™) standards, wireless local area network (WLAN) radios compliant with any of the various IEEE 1002.11 (WiFi™) standards, wireless wide area network (WWAN) radios for cellular phone communication, wireless metropolitan area network (WMAN) radios compliant with various IEEE 1002.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processor system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processor system 1008. The device applications may also include a device manager 1018, such as any form of a control application, software application, signal-processing and control module, code that is native to a particular device, a hardware abstraction layer for a particular device, and so on.

In this example, the device 1000 includes a mask module 1020 further to implementations of masking for mitigating visual contrast of a camera region of a display. Examples of the mask module 1020 include the mask module 116 described with reference to FIG. 1, and may be implemented to perform aspects of the various techniques described herein.

In this example, the device 1000 also includes a camera 1022 and device sensors 1024, such as a temperature sensor to monitor device component operating temperatures, and device sensors such as may be implemented as components of an inertial measurement unit (IMU). The device sensors 1024 may also include a light sensor for detecting light output from a display, such as from the camera region 114 and/or peripheral regions 120 of the display 106. The device 1000 can also include one or more power sources 1026, such as when the device is implemented as a wireless device or collaborative device. The power sources may include a charging and/or power system, and can be implemented as a flexible strip battery, a rechargeable battery, a charged super-capacitor, and/or any other type of active or passive power source.

The device 1000 can also include an audio and/or video processing system 1028 that generates audio data for an audio system 1030 and/or generates display data for a display system 1032. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1034. In implementations, the audio system and/or the display system are integrated components of the example device. Alternatively, the audio system and/or the display system are external, peripheral components to the example device.

Although implementations of masking for mitigating visual contrast of a camera region of a display have been described in language specific to features and/or methods, the subject of the appended claims is not necessarily limited to the specific features or methods described. Rather, the specific features and methods are disclosed as example implementations of masking for mitigating visual contrast of a camera region of a display, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

An apparatus including: a housing; a camera affixed within the housing; a display attached to the housing and positioned above the camera, the display including a camera region positioned to enable light transmission to the camera, and one or more peripheral regions adjacent the camera region; and a mask module implemented at least in part in hardware of the apparatus to: determine that an output condition occurs pertaining to the camera region of the display; generate one or more masks for display in the one or more peripheral regions and based on the visual condition pertaining to the camera region; and cause the one or more masks to be displayed in the one or more peripheral regions of the display.

Alternatively or in addition to the above described apparatus, any one or combination of: wherein the camera is positioned underneath the camera region, and the one or more peripheral regions of the display surround the camera region; wherein to determine that the output condition occurs pertaining to the camera region of the display includes to determine that output of pixels of the camera region reach a usage threshold; wherein to determine that the output condition occurs pertaining to the camera region of the display includes to determine that output of pixels of the camera region reach a usage threshold, wherein the usage threshold is based at least in part on a duration of output of the pixels and an output level of the pixels; wherein to determine that the output condition occurs pertaining to the camera region of the display includes to determine that output of pixels of the camera region reach a usage threshold, wherein the usage threshold is based on a measured output of the pixels of the camera region; wherein to generate the one or more masks for display in the one or more peripheral regions includes to generate the one or more masks to include an incrementally changing visual attribute from the camera region; wherein the visual attribute includes a color intensity; wherein to generate the one or more masks for display in the one or more peripheral regions includes to generate the one or more masks as a same shape of the camera region; wherein to generate the one or more masks for display in the one or more peripheral regions includes to generate the one or more masks as a different shape than the camera region.

A method including: determining that an output condition occurs pertaining to a camera region of a display; generating one or more masks for display in one or more peripheral regions that are peripheral to the camera region, wherein said generating is based on the visual condition pertaining to the camera region; and causing the one or more masks to be displayed in the one or more peripheral regions of the display.

Alternatively or in addition to the above described methods, any one or combination of: wherein said determining that the output condition occurs pertaining to the camera region of the display includes determining that output of pixels of the camera region reach a usage threshold defined based on duration of output of the pixels and output levels of the pixels; wherein said determining that the output condition occurs pertaining to the camera region of the display includes determining that output of pixels of the camera region reach a usage threshold defined based an estimated output decay of the pixels; said generating the one or more masks includes mapping the particular usage threshold to the one or more masks; wherein said generating the one or more masks includes generating multiple masks to each have an incrementally changing visual attribute from the camera region; wherein generating the multiple masks includes generating each mask of the multiple mask as increasing in size from a previous mask; wherein said causing the one or more masks to be displayed includes causing each mask of the multiple masks to be displayed concentrically with the camera region.

A method including: tracking an output usage of a camera region of a display to generate output usage values for the camera region; comparing the output usage values to one or more usage thresholds defined for the camera region of the display; determining that an output usage value corresponds to a particular usage threshold of the one or more usage thresholds; and performing an action to mitigate visual contrast between the camera region and other regions of the display.

Alternatively or in addition to the above described methods, any one or combination of: herein the output usage values include values that indicate an output level of pixels of the camera region and a duration of output of the pixels of the camera region; wherein said comparing the output usage values to one or more usage thresholds defined for the camera region of the display includes comparing the output usage values to a table that specifies the one or more usage thresholds based on a duration of output of pixels of the camera region at one or more output levels; wherein said performing an action to mitigate visual contrast between the camera region and other regions of the display includes: generating one or more masks for display in one or more peripheral regions of the display that are peripheral to the camera region, wherein said generating is based on mapping the particular usage threshold to the one or more masks; and causing the one or more masks to be displayed in one or more peripheral regions of the display that are peripheral to the camera region.

The invention claimed is:

1. An apparatus comprising:
 a housing;
 a camera affixed within the housing;
 a display attached to the housing and positioned above the camera, the display including a camera region positioned to enable light transmission to the camera, and one or more peripheral regions adjacent the camera region; and a mask module implemented at least in part in hardware of the apparatus to:
  determine that an output condition occurs pertaining to the camera region of the display;
  generate one or more masks for display in the one or more peripheral regions and based on the output condition pertaining to the camera region; and
  cause the one or more masks to be displayed in the one or more peripheral regions of the display.

2. The apparatus as recited in claim 1, wherein the camera is positioned underneath the camera region, and the one or more peripheral regions of the display surround the camera region.

3. The apparatus as recited in claim 1, wherein to determine that the output condition occurs pertaining to the camera region of the display includes to determine that output of pixels of the camera region reach a usage threshold.

4. The apparatus as recited in claim 1, wherein to determine that the output condition occurs pertaining to the camera region of the display includes to determine that output of pixels of the camera region reach a usage threshold, wherein the usage threshold is based at least in part on a duration of output of the pixels and an output level of the pixels.

5. The apparatus as recited in claim 1, wherein to determine that the output condition occurs pertaining to the camera region of the display includes to determine that output of pixels of the camera region reach a usage threshold, wherein the usage threshold is based on a measured output of the pixels of the camera region.

6. The apparatus as recited in claim 1, wherein to generate the one or more masks for display in the one or more peripheral regions includes to generate the one or more masks to include an incrementally changing visual attribute from the camera region.

7. The apparatus as recited in claim 6, wherein the visual attribute comprises a color intensity.

8. The apparatus as recited in claim 1, wherein to generate the one or more masks for display in the one or more peripheral regions includes to generate the one or more masks as a same shape of the camera region.

9. The apparatus as recited in claim 1, wherein to generate the one or more masks for display in the one or more peripheral regions includes to generate the one or more masks as a different shape than the camera region.

10. A method comprising:
  determining that an output condition occurs pertaining to a camera region of a display;
  generating one or more masks for display in one or more peripheral regions that are peripheral to the camera region, wherein said generating is based on the output condition pertaining to the camera region; and
  causing the one or more masks to be displayed in the one or more peripheral regions of the display.

11. The method as recited in claim 10, wherein said determining that the output condition occurs pertaining to the camera region of the display includes determining that output of pixels of the camera region reach a usage threshold defined based on duration of output of the pixels and output levels of the pixels.

12. The method as recited in claim 10, wherein said determining that the output condition occurs pertaining to the camera region of the display includes determining that output of pixels of the camera region reach a usage threshold defined based an estimated output decay of the pixels.

13. The method as recited in claim 10, wherein said generating the one or more masks comprises mapping a particular usage threshold to the one or more masks.

14. The method as recited in claim 10, wherein said generating the one or more masks comprises generating multiple masks to each have an incrementally changing visual attribute from the camera region.

15. The method as recited in claim 14, wherein generating the multiple masks comprises generating each mask of the multiple mask as increasing in size from a previous mask.

16. The method as recited in claim 15, wherein said causing the one or more masks to be displayed comprises causing each mask of the multiple masks to be displayed concentrically with the camera region.

17. A method comprising:
  tracking an output usage of a camera region of a display to generate output usage values for the camera region;
  comparing the output usage values to one or more usage thresholds defined for the camera region of the display;
  determining that an output usage value corresponds to a particular usage threshold of the one or more usage thresholds; and
  performing an action to mitigate visual contrast between the camera region and other regions of the display.

18. The method as recited in claim 17, wherein the output usage values comprise values that indicate an output level of pixels of the camera region and a duration of output of the pixels of the camera region.

19. The method as recited in claim 17, wherein said comparing the output usage values to one or more usage thresholds defined for the camera region of the display comprises comparing the output usage values to a table that specifies the one or more usage thresholds based on a duration of output of pixels of the camera region at one or more output levels.

20. The method as recited in claim 17, wherein said performing an action to mitigate visual contrast between the camera region and other regions of the display comprises:
  generating one or more masks for display in one or more peripheral regions of the display that are peripheral to the camera region, wherein said generating is based on mapping the particular usage threshold to the one or more masks; and
  causing the one or more masks to be displayed in one or more peripheral regions of the display that are peripheral to the camera region.

* * * * *